April 19, 1966 W. F. WOLFNER 3,247,400

TAPE PLAYING MACHINE

Filed Sept. 17, 1962 5 Sheets-Sheet 1

INVENTOR:
WILLIAM F. WOLFNER
BY
Curtis, Morris & Safford
ATTORNEYS.

April 19, 1966 W. F. WOLFNER 3,247,400

TAPE PLAYING MACHINE

Filed Sept. 17, 1962 5 Sheets-Sheet 2

INVENTOR:
WILLIAM F. WOLFNER
BY
Curtis, Morris & Safford
ATTORNEYS.

April 19, 1966 W. F. WOLFNER 3,247,400

TAPE PLAYING MACHINE

Filed Sept. 17, 1962 5 Sheets-Sheet 3

Curtis, Morris & Safford
ATTORNEYS

April 19, 1966 W. F. WOLFNER 3,247,400

TAPE PLAYING MACHINE

Filed Sept. 17, 1962 5 Sheets-Sheet 4

INVENTOR:
WILLIAM F. WOLFNER

BY

Curtis, Morris & Safford
ATTORNEYS:

PA & PB are open in "STOP"

PA Closes in Forward and PB opens

QA Closes in Reverse and QB opens

S Sw. Contacts shown in upper level, all reverse in lower level

W-Shift Sw. close in lower level

INVENTOR:
WILLIAM F. WOLFNER
BY
Curtis, Morris & Safford
ATTORNEYS.

United States Patent Office 3,247,400
Patented Apr. 19, 1966

3,247,400
TAPE PLAYING MACHINE

William F. Wolfner, Trumbull, Conn., assignor to Dictaphone Corporation, Bridgeport, Conn.
Filed Sept. 17, 1962, Ser. No. 223,879
9 Claims. (Cl. 307—112)

Figure 1:
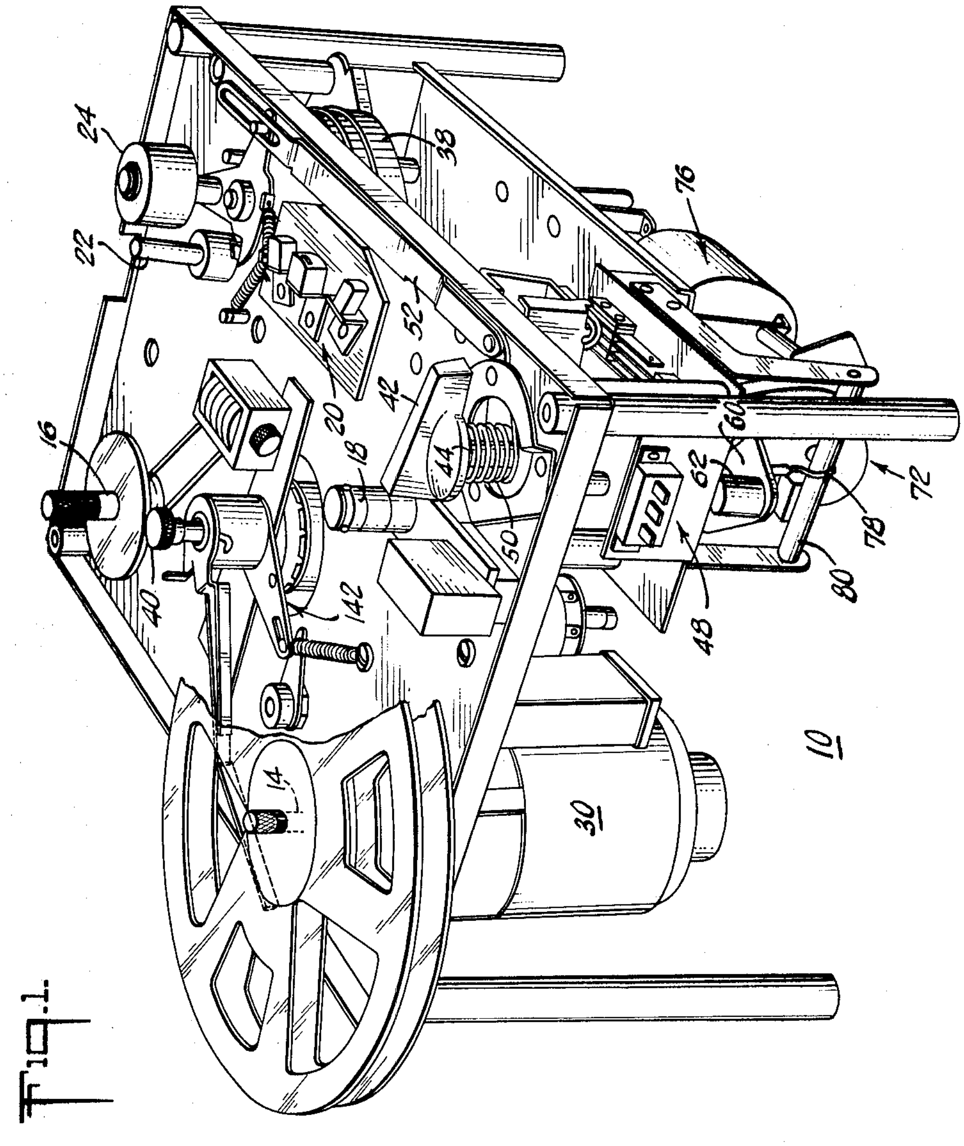

This invention relates to a machine for playing magnetic tape recordings; more particularly it relates to such a machine which can be entirely controlled by remotely placed electric push buttons.

An object of this invention is to provide an improved tape playing machine which can be remotely controlled.

Another object is to provide a compact and effective remote control arrangement for a tape machine such as shown in co-pending application U.S. Serial No. 223,876, filed September 17, 1962.

A further object is to provide an arrangement of this kind which is jam-proof and which automatically responds to respective electric signals corresponding to Forward and Reverse drive conditions and to Stop.

These and other objects will in part be understood from and in part pointed out in the following description.

In a tape playing machine to which this invention relates, there are a pair of spindles upon which a supply reel of tape and a takeup reel can be placed, respectively. Each spindle is driven by its own motor. The tape from the supply reel is adapted to be passed over a guide post, in front of an erase, record and playback head assembly, between a capstan and drive roller, and threaded into the takeup reel. The machine is set into its various drive conditions, such as Normal Forward and Reverse, and into Stop by means of a mechanical control shaft. This shaft physically positions a cam thereby opening and closing in proper sequence the contacts of a number of electrical switches which control the spindle motors, either braking or driving them as desired.

The control shaft has three angular positions to which it can be turned, namely: center, corresponding to "Stop," left, corresponding to "Normal Forward," and right, corresponding to high speed "Reverse." When in its center position only, the shaft can be pushed, against the action of a spring, axially downward to a lower level in which there are again three angular positions, namely: center, "Stop," left, "Fast Forward," and right, high speed "Reverse."

The present invention in one of its aspects provides an electro-mechanical arrangement which can set the control shaft of such a machine into its various control positions. This arrangement is relatively simple and compact and is controllable from a remote location by push button switches. The electric circuit provided as part of this arrangement insures that the shaft will necessarily be operated with a slight pause in "Stop" when going from one drive condition to another. This insures that the tape is not spilled by too little tension or broken by too much. In addition, various automatic features are provided in conjunction with this control circuit to further simplify and make fool-proof the operation of the machine.

In accordance with the invention in one specific embodiment thereof, a tape playing machine, such as described above, is provided with a unique rotary solenoid coupled to the control shaft of the machine. This solenoid and its associated electrical circuitry can turn and shift the control shaft to its Normal Forward, Fast Forward, Fast Reverse, and Stop positions in accordance with the momentary closing of a corresponding one of remotely positioned electric push buttons. There is also provided a unique arrangement for the remote indication of the amount of tape which has been played.

Figure 2:
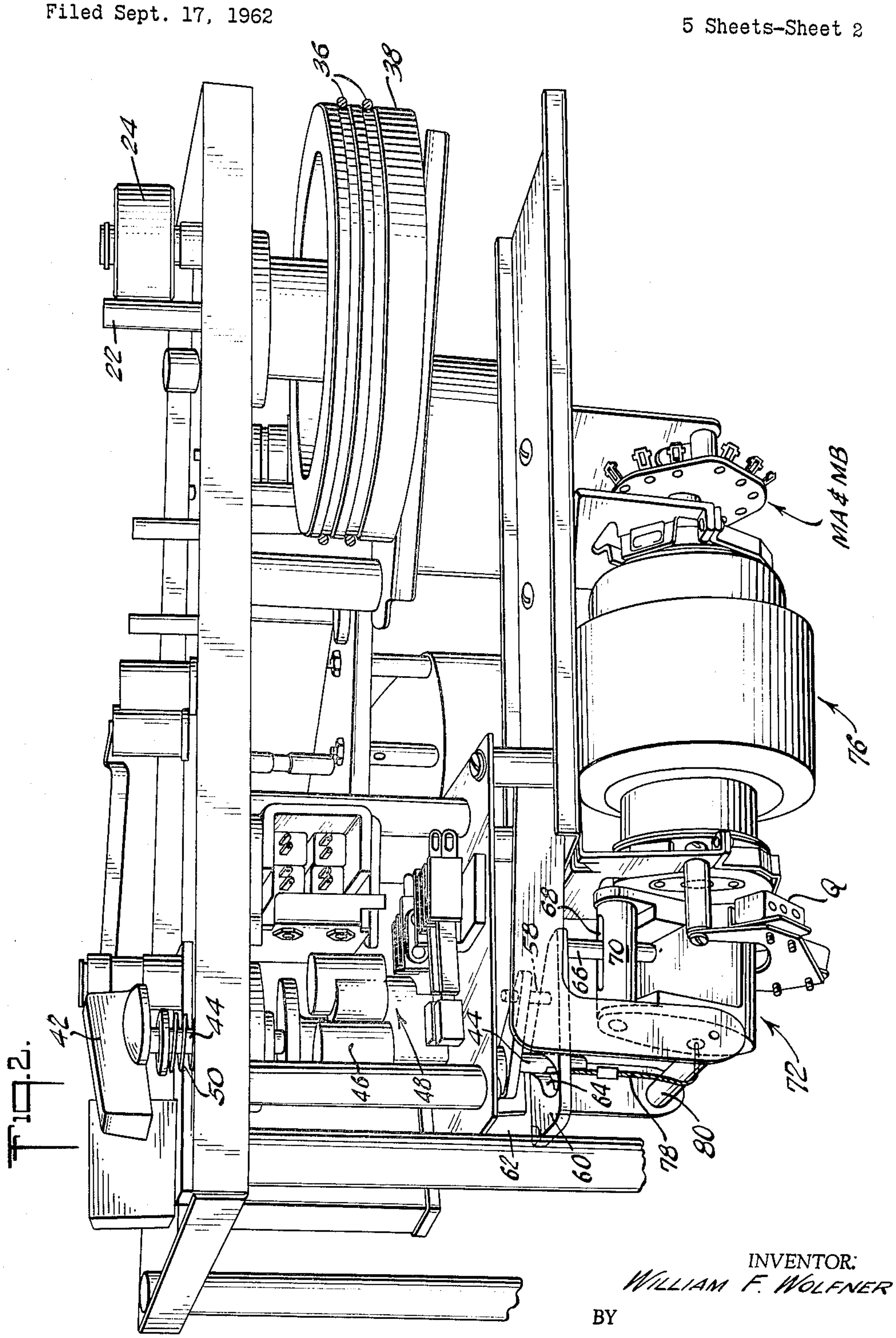
Figure 3:
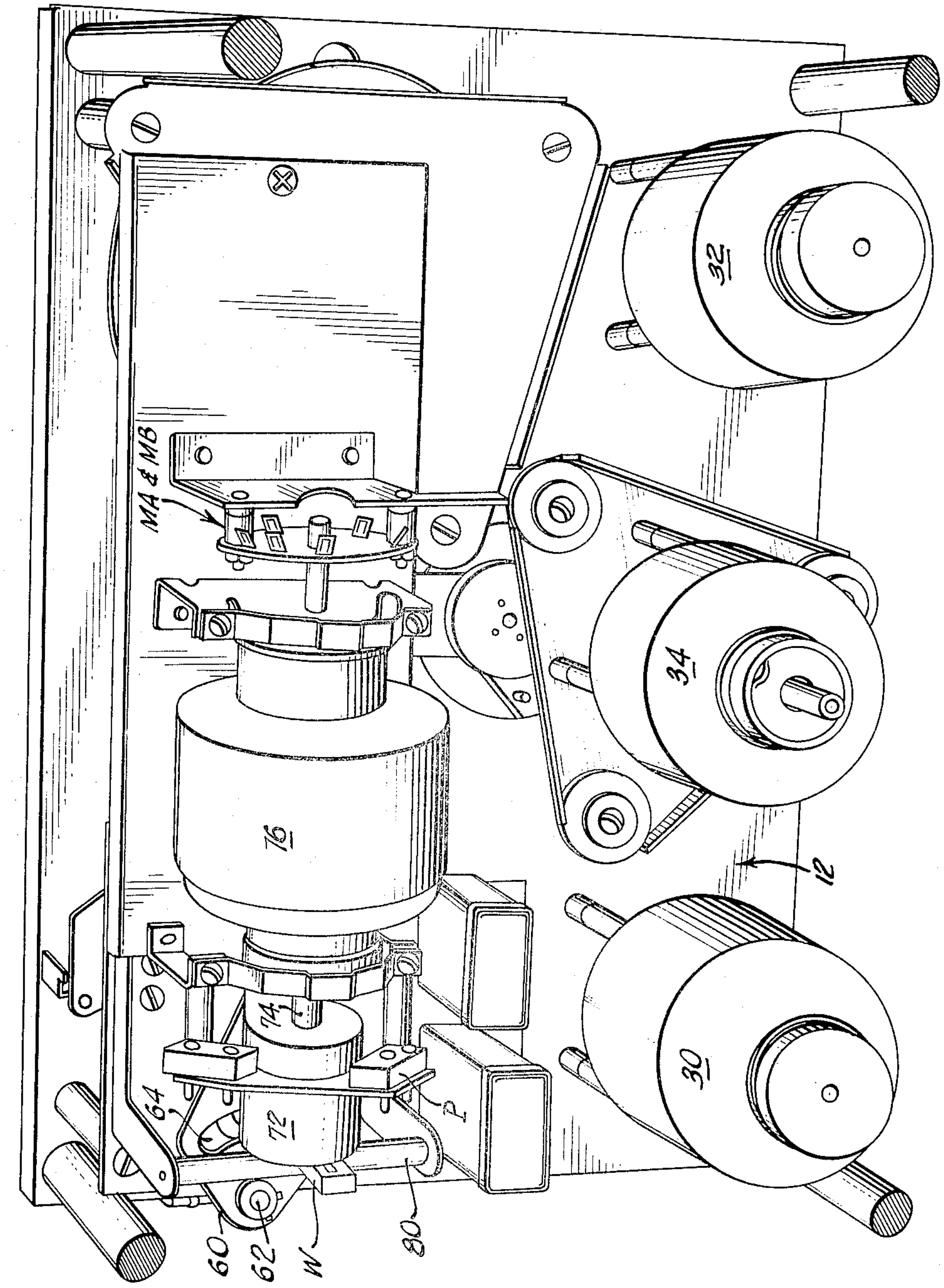
Figure 4:
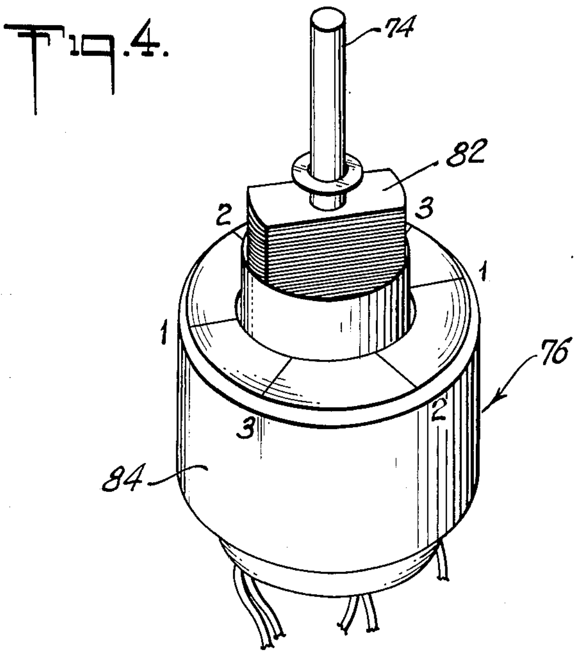
Figure 5:
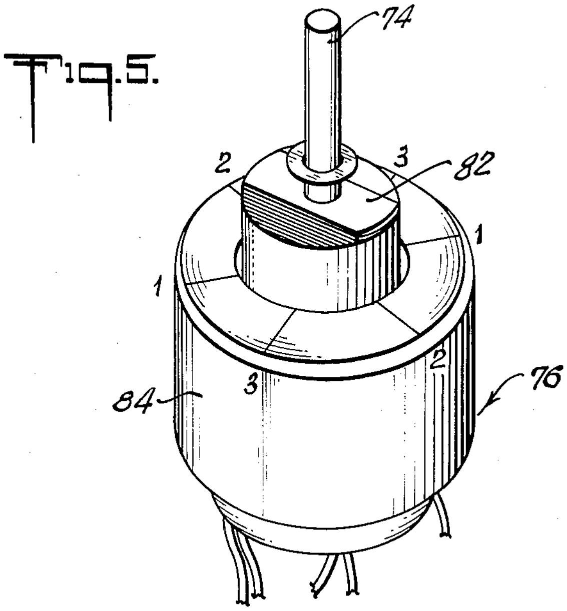
Figures 6, 7:
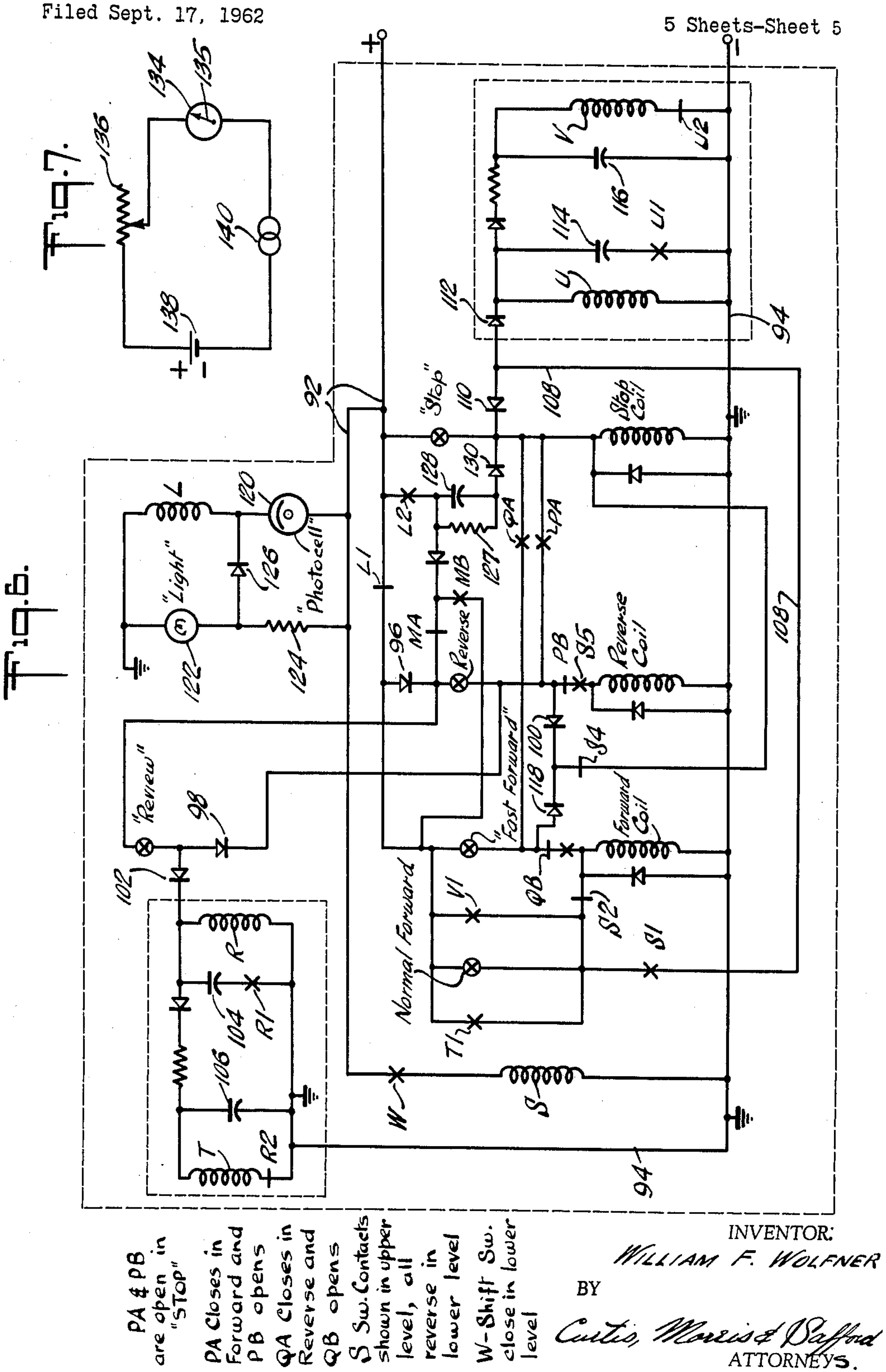

A better understanding of the invention together with a fuller appreciation of its many advantages will best be gained from a study of the following description given in connection with the accompanying drawings wherein:

FIGURE 1 is a perspective view of a tape machine embodying features of the invention, FIGURE 2 is an enlarged perspective view of the front side of the machine showing the rotary solenoid, FIGURE 3 is a perspective view of the bottom of the machine, FIGURE 4 is a perspective view of the rotary solenoid in one of its positions, FIGURE 5 is a similar view of the solenoid in another of its positions, FIGURE 6 is a diagram of the electric circuit associated with the electric solenoid, and FIGURE 7 is a circuit diagram of the remote tape footage indicator.

The machine 10 shown in FIGURES 1, 2, and 3 includes a frame or base 12 which is adapted to be enclosed in a housing, not shown for the sake of clearer illustration. Projecting upward from the frame near the left rear corner is a supply reel spindle 14 upon which a reel of tape to be played can be placed. Similarly, near the right rear corner of the frame is a takeup reel spindle 16 which receives an empty reel onto which the tape can be wound. The tape is passed from the supply reel over a guide post 18, in front of a magnetic head assembly 20, between a capstan 22 and a drive roller 24 and onto the takeup reel.

Associated with spindle 14 is a motor 30, see also FIGURE 3, and with spindle 16, a motor 32. Mounted beneath the frame between the spindle motors is a similar motor 34, which by means of two endless belts 36 (see FIGURE 2) drives a flywheel 38. The latter is fast on the lower end of capstan 22. Drive motor 34 is turned on and off by means of a knob 40 located, as seen in FIGURE 1, directly above the center of the base.

The machine can be manually set into its various drive conditions by means of a control knob 42 located near the left front corner of the machine. This knob is mounted on a control shaft 44 the lower end of which, as seen in FIGURE 2, carries a cam 46 which in turn controls the opening and closing of a number of electrical switches in a switch assembly 48. These switches which control the driving and braking of the spindle motors are described in detail in the aforesaid patent application, to which the reader is referred.

As seen in FIGURES 1 and 2, control shaft 44 is urged to the upper of two vertical levels by means of a spring 50. Control knob 42, in the position shown in FIGURE 1, is in its upper level and center or Stop position. The knob can be turned counter-clockwise to Normal Forward, whereupon a linkage 52 actuated by shaft 44, presses roller 24 toward capstan 22 thereby pressing the tape against it.

When in Stop, the control shaft can be pushed vertically down to its lower level and rotated counter-clockwise into Fast Forward drive condition. Rotation clockwise in the lower level sets the control into Reverse. In neither of these high speed conditions is roller 24 pinched against the capstan.

The positioning of control shaft 44 is accomplished electrically, in accordance with the invention, as follows. As seen in FIGURE 2 just above the lower end of shaft 44 is fastened a lever arm 56, the outer end of which has a hole engaging an upstanding pin 58. This pin is fixed on a plate 60, the left end of which is pivoted at 62 to the frame. Just to the right of this pivot, plate 60 has a crescent-shaped opening 64 which clears shaft 44 and permits the shaft to project freely through the plate while the latter is rotated back or forth. The right end of plate 60 has a pin 66 which projects down and engages a slot 68 in a bar 70. This bar is fixed on a cam 72 (see FIGURE 3) which is carried on the left end of a shaft 74 of a rotary solenoid 76 (see also FIGURE 4). As seen in FIGURE 2, the end of shaft 74 at the left end of cam 72 is connected by means of a wire cable 78 passing over a frame pin 80 to the lower end of control shaft 44.

FIGURES 4 and 5 show the internal structure of solenoid 76, the end bearings being broken away here for clearer illustration. Shaft 74 has fixed to it a rotor 82, which is simply an oblong bar of magnetic material. This is mounted (on bearings) within a stator 84, the rotor being axially slidable within the stator from the position shown in FIGURE 4 to that of FIGURE 5. In addition the rotor can be turned to three different angular positions about 45° apart as indicated by the lines 1—1, 2—2, and 3—3. To this end the stator is wound with three sets of coils, and when any one set of coils is energized, magnetic poles will be generated which will pull the rotor into one of the three angular positions indicated.

As will appear, orientation of rotor 82 along lines 1—1 corresponds to the Stop position of the control shaft. Orientation of rotor 82 along lines 3—3 in the retracted position of FIGURE 5 corresponds to the lower level clockwise position of the control shaft, namely, Fast Forward. Orientation along lines 2—2 in the retracted position of FIGURE 5 corresponds to Reverse. In the withdrawn position of the rotor seen in FIGURE 4, orientation along lines 3—3 corresponds to Normal Forward.

Now, when the solenoid is not energized, and control shaft 44 is in Stop position, the action of spring 50 on the control shaft holds the shaft in its upper level. The shaft in turn pulls the rotor of solenoid to the withdrawn position shown in FIGURE 4. If the Stop coils of the solenoid were now energized, the rotor would remain oriented along lines 1—1 but would be pulled into the stator to the level indicated in FIGURE 5. On the other hand, in the position of FIGURE 4 (where the Stop coils are not energized), if the Normal Forward coils were energized, the magnetic pull on the rotor is such that it will first rotate to the direction of lines 3—3 rather than be drawn axially into the stator. And of course, as soon as the control shaft begins to rotate from Stop, it will be locked in the level (here the upper level) it then occupies. But if the solenoid is first energized in Stop, and then immediately while its rotor is in the retracted position of FIGURE 5 the Reverse coils are energized, the rotor will turn to the position shown in this figure. This, as mentioned previously, corresponds to Fast Forward.

The electric circuit 90 for controlling solenoid 76 is shown in FIGURE 6. The circuit is energized at the right by a direct voltage applied to a positive lead 92 and to a ground lead 94. The various remote push buttons labeled "Stop," "Reverse," "Fast Forward," "Normal Forward," and "Review" are connected in the circuit as indicated. Similarly, the coils of solenoid 76 corresponding to Stop, Reverse and Forward are as shown. Relay coil S which controls contacts S1, S2, S3, S4 and S5 is energized by the closing of a switch W. The latter is physically located, as seen in FIGURE 3, opposite the left end of cam 72, the contacts of switch W are open when the control shaft is in its upper level and are closed when the shaft is in its lower level. In FIGURE 6, open contacts are indicated by "X," and closed contacts by "I." In addition to relay S in circuit 90, there are relays R, T, U, V and L, each controlling, respectively, one or more sets of contacts. Switch P having contacts PA and PB shown in FIGURE 6, and switch Q, having contacts QA and QB, are physically positioned, as seen in FIGURE 3 on opposite sides of cam 72. Thus, these switches sense whether the solenoid is set in Forward or in Reverse.

When the Stop button in circuit 90 is actuated, it connects the Stop coil of solenoid 76 directly across leads 92 and 94 thereby setting the control shaft of the tape machine into Stop position, as explained previously. Similarly, when the Normal Forward button is pressed, it connects the Forward coil of the solenoid across the power line via contacts S2 and L1, which are closed when the circuit is in the de-energized Stop condition shown. As soon as the Forward coil is energized, the solenoid turns the control shaft, which is in its upper level, into Normal Forward drive.

If now the operator wishes to review a short section of the tape just played, he pushes the Review button. This first sets up a circuit through contacts L1, a diode 96, the Review button, a diode 98 and thence through a diode 100, contacts S4 to the Stop coil. As soon as this coil is energized, solenoid 76 rotates to Stop position and then its rotor is drawn into the stator, thereby closing the contacts of switch W and energizing relay S. This immediately in turn closed contacts S5 and sets up a circuit from the Review button through diode 98, contacts PB, contacts S5 to the Reverse coil. Thus, the rotor of the solenoid, while still in its lower level is rotated to alignment with lines 2—2 in FIGURE 5, and the control shaft is set into Reverse.

In the meantime, the closing of the Review button has energized a time delay network via a diode 102. This first energizes a relay R closing contacts R1 and opening contacts R2. This permits a capacitor 104 and a capacitor 106 to charge. Then after the Review button is released, relay R is held energized for a short instant (about 2 seconds) by the discharge of capacitor 104 into relay R. As soon as the relay is de-energized contacts R2 close and capacitor 106 discharges into relay T. This closes contacts T1 in parallel with the Normal Forward push button and sets up a circuit through contacts S1 (now closed) via a lead 108, and a diode 110 to the Stop coil. However, in addition to stopping the machine the energization of lead 108 actuates another time delay network. Thus through a diode 112 a relay U is energized closing contacts U1 and opening U2. Then capacitors 114 and 116 charge. As soon as lead 108 is deenergized, capacitor 114 discharges into relay U holding it closed for a short time. Then the relay drops out closing contacts U2 and causing capacitor 116 to energize relay V. This closes contacts V1 in parallel with the Normal Forward button and since the circuit contacts, with the exception of V1, are now as shown in FIGURE 6, the Forward coil will be energized thereby setting the tape machine into Normal Forward drive.

With the machine running in Normal Forward, pressing the Reverse button does the following. Since contacts PA are closed while PB are open, a circuit is first set up to the Stop coil, and then immediately after through the closing of contacts PB and S5 to the Reverse coil. Similarly, pressing the Fast Forward button first energizes the Stop coil via a diode 118 and contacts S4, and then immediately after the Forward coil while the control shaft is still in its lower level. This of course sets the machine into Fast Forward.

Each end of the magnetic tape being played by the tape machine is provided with a transparent leader, the tape being normally opaque to light. Now, as seen in FIGURE 1, post 18 contains a light bulb and opposite the post is a photocell 120. Thus, when the transparent leader at either end of the tape is between the post and cell, the latter is energized. Photocell 120, shown at the top of FIGURE 6, is connected in series with a relay L and the power line 92. In a parallel circuit a light bulb 122 (located in post 18) is connected in series with a resistor 124 and lead 92. A diode 126 connects the center junctions of these parallel circuits as shown. Whenever the photocell is energized, sufficient current flows through relay L to energize it thereby opening contacts L1 and closing L2. Then, depending upon whether contacts MA or MB are closed, the circuit is prevented from being put into Forward, or into Reverse. Switches MA and MB are memory switches, switch MA being closed in Forward and remaining so until solenoid 76 is put into Reverse, whereupon switch MB is closed and MA is opened. Switch MB remains closed, and MA open, until the solenoid is again put into Forward. Switches MA and MB are physically positioned at the right end of solenoid 76 as seen in FIGURES 2 and 3 and are coupled to the shaft of the solenoid by a suitable lost motion connection.

Assuming that switch MA is closed and MB open, as shown in FIGURE 6, which means that the circuit is or has been in Forward, when contacts L2 close and L1 open the Stop coil will be energized through a resistor 127 and capacitor 128 in parallel and a diode 130. Thereafter, only the Reverse button can be actuated, the Forward buttons being disabled by the open contacts L1 and MB. On the other hand, if MB were closed and MA open, the circuit could only be put in Forward. As soon as the tape has been run back enough so that tape, rather than transparent leader lies between photocell 120 and light 122, contacts L1 will again be closed and L2 opened. In the event that light 122 burns out relay L will be energized thereby providing a fail-safe feature.

FIGURE 7 shows the electrical circuit for remote indication of tape footage which has been played. Here, the footage is indicated on a meter 134 which is positioned remotely along the control push buttons of FIGURE 6. Meter 134, which has a needle 135, is energized with direct current through a rheostat 136 from a battery 138. In series with the battery and rheostat is an A.C. source 140 which applies an alternating component of current to meter 134. This causes needle 135 to quiver slightly and thus make apparent to a person viewing it, that the circuit is energized even though the needle may otherwise move imperceptably across the face of the meter. This is important for the sake of people inexperienced with the functioning of electrical equipment.

Rheostat 136 is physically positioned, as seen in FIGURE 1, to the right of spindle 14. The rheostat is coupled by means of a linkage 142 to a sensing arm 144 which is pivoted on a shaft co-axial with knob 40. The outer end of arm 144 is adapted to bear against the outer layer of tape wound on the supply reel on spindle 14. As more and more tape is played, the arm moves to the position shown and, of course, in so doing changes the setting of rheostat 136.

The above description is intended in illustration and not in limitation of the invention. Various changes in the embodiments described may occur to those skilled in the art and these can be made without departing from the spirit or scope of the invention as set forth.

I claim:

1. In a tape machine of the character described, a control shaft by which the machine is set into forward, reverse and stop conditions, said shaft being axially shiftable to two levels in a center position and rotatable right or left from the center position, and electro-mechanical means for remotely controlling said shaft to set said machine into its various conditions, said means including a rotary solenoid having a shiftable armature linked to said shaft, three coils in said solenoid to orient said armature respectively in center right and left positions correspondingly to said shaft positions, and an electric circuit for energizing said coils including remotely positioned switches corresponding to forward, reverse and stop conditions of said machine.

2. The arrangement in claim 1 wherein said circuit includes switching means to energize two of said coils in sequence whenever going from forward to reverse and vice versa.

3. The arrangement in claim 1 wherein said shaft is spring-urged to one of its two levels, the armature of said solenoid being shifted by said shaft axially out of said solenoid when not energized.

4. An improved electro-mechanical solenoid arrangement comprising a stator having center, right and left coils respectively, a rotor adapted to be oriented center right and left in accordance with which of said coils is energized, said rotor being mechanically urged axially out of said stator, circuit means to energize said coils in desired sequence, and means to prevent said rotor from being drawn into said stator except when said center coil is energized.

5. The arrangement in claim 4 wherein said rotor is a flat piece of magnetic material, and said circuit means includes electric switches to sense the orientation of said rotor and its axial position.

6. The arrangement in claim 4 wherein said circuit means includes switch means to first energize said center coil and then immediately to energize another coil.

7. A tape playing machine having forward, reverse and stop conditions, said machine including a manually operable control shaft having an upper and a lower level, a center position corresponding to stop and in which said shaft can be shifted up or down, spring means urging said shaft up, detent means to prevent said shaft from being shifted up or down when it is not in center position, said shaft having a rotated position corresponding to forward and an oppositely rotated position corresponding to reverse, the upper level rotated position corresponding to normal forward and the lower level rotated position corresponding to fast forward, and electro-mechanical means to rotate said shaft to its various conditions, said means including a rotary solenoid having a stator with center right and left coils corresponding to stop, forward and reverse positions of said shaft, a rotor in said stator coupled to said shaft and axially shiftable therewith, said rotor being drawn into said stator when its center coil is energized, said rotor being rotated when one of said left and right coils is energized, and circuit means to energize said coils in desired sequence.

8. The arrangement in claim 7 wherein said circuit means includes a time delay network to energize one of said right and left coils, then said center coil, and then the other of said right and left coils.

9. The arrangement in claim 7 wherein said circuit means includes end-of-tape sensing means which automatically energizes said center coil and prevents energizing of a selected one of said right and left coils.

References Cited by the Examiner

UNITED STATES PATENTS

| | | | |
|---|---|---|---|
| 2,033,713 | 3/1936 | Hughey | 33—172 |
| 2,745,027 | 5/1956 | Williford | 310—103 |
| 2,805,373 | 9/1957 | Bonnell | 310—191 X |
| 2,833,939 | 5/1958 | Leber | 307—112 |
| 2,848,630 | 8/1958 | McNicol et al. | 307—112 |
| 3,069,777 | 12/1962 | Isbell | 33—172 |

FOREIGN PATENTS

| | | |
|---|---|---|
| 417,082 | 8/1925 | Germany. |

MILTON O. HIRSHFIELD, *Primary Examiner.*

MAX L, LEVY, RUSSELL C. MADER, *Examiners.*